United States Patent Office 3,623,889
Patented Nov. 30, 1971

3,623,889
CONFECTION AND PROCESS FOR
PREPARING SAME
Roderick Falconer, Reading, and Ernest John Hughes, Hitchin, England, assignors to Lever Brothers Company, New York, N.Y.
No Drawing. Filed June 26, 1968, Ser. No. 740,840
Claims priority, application Great Britain, June 29, 1967, 30,168/67
Int. Cl. A23g 1/00, 3/00, 5/00
U.S. Cl. 99—134
18 Claims

ABSTRACT OF THE DISCLOSURE

Particles of fat containing effervescent material are dispersed in water ices and ice cream for release of effervescence when the ice and fat melt on consumption.

This invention relates to confections, and especially to confections containing ice.

Confections containing solid material which effervesces when brought into contact with water, and therefore with saliva in the mouth, are well known. The effervescent material employed is commonly a mixture of citric acid and sodium bicarbonate, which remains stable so long as moisture is absent. Such materials can be used in confections by surrounding the solid powder mixture with a container of sugar that is destroyed in the mouth by biting and chewing or by dissolution with release of the powder to make contact with saliva. If the containing material does not wholly enclose the effervescent material care has to be taken to keep the confection away from moist air, for otherwise the effervescing qualities gradually disappear.

Although ice free of water will not cause solid citric acid and sodium bicarbonate to react with one another, it is impossible to produce in the massive form a frozen water confection in which effervescent material is in surface contact with the ice, and which will effervesce when the ice melts, for there is no way of dispersing the effervescent powder in the ice. The effervescent material can be placed in a waterproof container made of edible material, for instance waterproofed wafer biscuit, and this dipped into water contained in a mould and the ice formed around it by freezing, but the effervescent material is not distributed throughout the ice and is therefore only encountered when the inner layer of ice surrounding the material is breached. Ice confections mounted on a stick as holder are normally eaten by licking or sucking, so that effervescent material within a container inside the ice would only be reached when the ice has been consumed: and even when such a confection is eaten with a spoon the result is essentially one of eating separate confections. Moreover it is impractical to make the waterproofed containers so small that a large number of them carrying effervescent material can be dispersed through the mass of an ice confection, so that consumption of ice and effervescence in the mouth are simultaneous and inseparable.

It has now been found that if an effervescent material is dispersed in a water-impermeable edible substance that is in the solid state during storage, but becomes fluid during consumption, the effervescent material is released sufficiently for water in contact with the surface of the water-impermeable substance to produce the desired effervescence. Thus by using the principle of releasing the effervescent material (or an essential component of it) from a carrier solid before but fluid during use, not only can the problem of providing a barrier impermeable to moisture before consumption be solved, but where the confection is a frozen water confection the effervescent material can be surrounded by the ice without the provision of an intervening container. Moreover, it has been found that particles of the water-impermeable substance carrying effervescent material and sufficiently small to be distributed throughout an ice confection, do not lose their power to cause effervescence over a period of months despite the relatively large area of their surface contact with matrix of ice containing occlusions of aqueous liquid, provided the substance is sufficiently water-impermeable and sufficiently solid at the temperature of storage to prevent diffusion of aqueous liquid into the particles or of the effervescent material to the surface of the particles. By employing this new principle, it is therefore possible to produce novel confections, for example chocolate which effervesces when eaten and water-ices and ice cream which effervesce during consumption.

A confection of the invention is one comprising a solid water-impermeable edible substance that is fluid at body temperature, and a material that effervesces on contact with water, the solid water-impermeable substance containing at least one essential component of the effervescent material, so that effervescence occurs when the solid water-impermeable substance is made fluid by an increase of temperature and effervescent material is brought into contact with waeter.

Preferably the solid water-impermeable substance contains all the essential components of the effervescent material.

The invention includes a process for preparing a confection containing a material that effervesces on contact with water, which comprises incorporating at least one essential component of the effervescent material in a solid water-impermeable substance that is fluid at body temperature, so that effervescence occurs when the solid water-impermeable substance is made fluid by an increase of temperature and the effervescent material is brought into contact with water.

The water-impermeable edible substance is one that is solid at the temperature at which the confection is stored and which becomes fluid at a higher temperature up to 37° C. Especially valuable as water-impermeable edible substances are fats, that is, fatty acid glycerides, which are preferably triglycerides. Fatty acid esters of monohydric alcohols, for instance ethanol, or of other polyhydric alcohols, for instance glycol, can also be employed. The water-impermeable edible substance should be as free of traces of water as possible when the essential interacting components of the effervescent material are present together, so that there is the minimum of loss of effervescence values by reaction between them during their incorporation or subsequently. It can contain other non-aqueous components of the confection, for instance colouring and flavouring materials, and sweetening agents, for example sugar, saccharin or sodium cyclamate.

The fat or other water-impermeable substance can be one that is effectively solid at 25° C., but melts in the mouth, for instance natural butter oil or a confectioner's hard butter, for example cocoabutter or a cocoabutter substituted; one of the cocoabutter substitutes described in British patent specifications 827,172, 861,016 and 925,805 can be used. Using such a substance it is possible to store the confection at ambient temperature. A fat having a dilatation at 25° C. or more than 1000 and preferably of more than 1500, and especially 1700, and at 35° of less than 250, preferably less than 100 and especially less than 50 can be employed. The fat should have a slip melting point of below 38° C. An effervescent chocolate confection can be provided by use of the invention in this way.

Alternatively, the water-impermeable substance can be one which is fluid at a temperature within the range of from 0° to 30° C., for instance between 5° and 25° C., and preferably between 10° and 20° C. The substance is preferably effectively solid at −10°, −5° or 0° C. It preferably has a melting point of either between 0° and 10° C. or between 10° and 20° C. Confections based on the use of such substances are stored at a temperature below that at which the substances melt, until they are to be consumed. Thus a water-ice can be based upon ice within which the water-impermeable edible substance containing at least one of the essential components of the effervescent material is in direct surface contact with the ice: the water-impermeable substance is preferably dispersed in particulate form through the ice.

As many fats melt over wide ranges of temperature, and some still contain solid material even at body temperature, it is to be understood that all that is necessary is for it to have melted sufficiently at the temperature of use for the fat to become sufficiently fluid for release of a substantial amount of effervescent material to occur. Preferably the substance is wholly liquid at body temperature, and where the confection depends upon a lowered temperature for its appeal, as in an ice confection that releases its flavour at the temperature of melting ice, preferably the water-impermeable edible substance is wholly liquid at 30° C., or even at 20° C. The melting characteristics of the water-impermeable substance can be chosen so that it melts simultaneously with the ice, or not until the ice has melted, giving a delayed release of effervescence, or at some stage between these extremes. A fat having a dilatation of more than 300 at 0° C., or more than 250 at 5° C., or more than 200 at 10° C., and of less than 50 at 35° C., or less than 75 at 25° can be employed.

By the dilatations referred to above are meant the isothermal melting expansion expressed in cubic millimetres and referred to 25 grams of material and to a particular base temperature. Where the fat melts over a short range of temperatures, as with a confectioner's hard butter, the dilatations can be those measured by the method described in British patent specification 827,172, at page 3, lines 112 to page 4, line 74, using an appropriate base temperature (60° C. with a confectioner's hard butter). Such a method can be modified where the fat melts over a wide range of temperature because no stabilisation step involving cooling to 0° C., allowing to warm to 26° C. and holding that temperature for a long period is then necessary: in such an instance the stabilisation step is omitted and also a base temperature is chosen appropriate to the fat at which it has no solid content.

Suitable fats for use in such confections are mixtures of cocoabutter and coconut oil, and mixtures of hardened refined coconut oil, for instance of slip melting point 33° C., and refined groundnut oil, for instance a mixture of 1 part of hardened coconut oil to 3 parts of groundnut oil that melts at between 5° and 10° C.

The effervescent material preferably comprises an edible water-soluble acid that is solid at the temperature of storage of the confection, for example citric, malic, lactic or tartaric acid, and a suitable solid water-soluble carbonate from which carbon dioxide is liberated by the acid in aqueous solution. Sodium bicarbonate will normally be employed. At least one of the components of the effervescent material is placed within the water-impermeable substance so that the latter forms a continuous phase around it. Thus the bicarbonate can be placed within the water-impermeable substance, and an acid component placed outside, so that when the substance melts and is brought into contact with water, for instance salvia in the mouth, the bicarbonate dissolves and reacts with the dissolved acid, liberating carbon dioxide and producing effervescence. Alternatively an acid component can be placed within the water-impermeable substance, and the bicarbonate outside, so that the two components are similarly brought together when the acid is released into solution. Preferably both acid and carbonate components are contained in water-impermeable substance. The water-impermeable material containing effervescent material component can be used to enrobe another part of the confection containing any remaining component, or can itself be enrobed; it can form layers with another part of the confection. The water-impermeable material containing one component of the effervescent material can be enrobed with similar material containing the other component.

Preferably one or more or all of the components of the effervescent material are dispersed in the water-impermeable substance, and preferably the acid and carbonate are dispersed together in the substance, as this provides for even release of the contained material when the substance melts, and enables easy production of water-impermeable substance in particulate form suitable for dispersion throughout the confection. Thus a mixture of finely powdered acid and finely powdered bicarbonate in suitable proportions can be dispersed in the dry fluid water-impermeable substance. This can be used in the molten state for enrobing or as a couverture, forming a layer of solid confection which is part of an article of confection containing other materials. Alternatively it can be formed into small particles and cooled to solidify it: the resulting granular particles are themselves a confection, and can be incorporated as such in an article of confection containing other materials. The confection can thus itself take a particulate form, as when it consists of such particles containing all the effervescent material components. In a typical process for preparing such a confection, a dispersion of effervescent material in the molten water-impermeable substance is spray cooled, for instance by forcing it through an orifice under pressure into a cold atmosphere: liquid nitrogen can be used to provide such an atmosphere when a low melting substance is used.

Preferably the confection in an ice confection, for example a water ice or ice cream. The water-impermeable substance containing the effervescent material or its component can then be in surface contact with ice. The ice can be enrobed with the water-impermeable substance. Thus the ice confection can be a water ice or ice cream which has been dipped into a molten chocolate coating composition containing dispersed effervescent material and has thus become enrobed with solid coating composition. Alternatively particles of the water-impermeable substance can be dispersed through the ice by placing them in the aqueous medium to be found into a water-ice at a temperature below the melting point of the water-impermeable substance, stirred to maintain them dispersed through the aqueous medium, and the aqueous medium cooled until it crystallises to form the water-ice in which the particles are embedded. The particles containing effervescent material can be incorporated in an ice cream mix at a suitable temperature in a batch freezer and the mix cooled and beaten under pressure with air to give an ice cream containing the dispersed particles.

Particularly valuable are ice confections comprising water-impermeable substance in particulate form dispersed in an ice matrix, the particles of water-impermeable substance having dispersed within the ma mixture of solid water-soluble edible acid and solid sodium bicarbonate, the water-impermeable substance providing the continuous phase within the particles.

Where the water-impermeable substance is in particulate form, preferably particles of below 0.25 cc., and especially below 0.001 cc. volume are employed. Such particles are preferably of a generally spherical form of below 0.5 cm. diameter, and preferably within the range of 0.001 mm. to 1 mm., especially from 0.05 to 1 mm., diameter. Such small particles require micronisation of the solid acid and carbonate components of the effervescent material. The particles can consist of two kinds, each containing one of the components, if desired. Conveniently from 5 to 40 or 50% of effervescent material or its component is present in the water-impermeable substance.

The confection can be an ice confection, for instance a water-ice, prepared using an aqueous medium comprising water, sugar, flavouring material, and a stabiliser, for instance, sodium carboxymethyl cellulose or gelatin; the aqueous medium can contain the acid to provide some or all of one component of the effervescent material.

The proportion of water-impermeable substance containing effervescent material component or components to the remaining material of the confection will depend upon the type of confection concerned, and for a water-ice will normally provide from 5 to 20% of the total weight or volume of water-ice.

In preparing a water-ice of the invention, preferably both the water-impermeable substance carrying the effervescent material or its component, and the water-ice formulation are cooled to from 0 to 5° C. before they are mixed. In order to maintain the particles in suspension, it can be advantageous to arrange for the particles used to be coated with a dispersing agent, for instance a fatty acid monoglyceride, sodium stearate sodium dodecylbenzene sulphonate, or other ionic or non-ionic emulsifying agent.

The invention is illustrated by the following examples, in which temperatures are in ° C.

EXAMPLE 1

Finely powdered anhydrous citric acid (2 parts by weight), and finely powdered anhydrous sodium bicarbonate (2.5 parts), are mixed together and stirred into molten chocolate (12 parts), and the chocolate poured into a mould and allowed to cool. The product is an effervescing chocolate.

EXAMPLE 2

To cocoamass (41 parts by weight) at 50° is added icing sugar (45 parts) and the mixture refined with a three-roll chocolate refiner to reduce the size of all particles to below 30 microns. A mixture of cocoa butter (14 parts) and lecithin (0.45 part) is added to the refined mass and the product conched. To the conched product at 45° is added a mixture of icing sugar (14.3 parts), finely powdered anhydrous citric acid (2.7 parts) and finely powdered anhydrous sodium bicarbonate (3.0 parts) and the chocolate composition is well stirred, then tempered, poured into a mould and allowed to cool.

EXAMPLE 3

Defatted cocoa powder (4 parts by weight, containing 10–12% fat residue), skimmed milk powder (14 parts), icing sugar (21.5 parts) and salt (0.05 part) are mixed together. Cocoa butter (17.5 parts), refined coconut oil (43 parts) and lecithin (0.2 part) are mixed together at 40°. One third of the fat mixture is added to the previous mix of dry ingredients to give a dough, which is then refined with a three-roll chocolate refiner to reduce the size of all solid particles to below 30 microns. The remainder of the fat mixture is then added and the resulting chocolate coating composition mixed until it is homogeneous.

A mixture of icing sugar (14.3 parts), finely powdered anhydrous citric acid (2.7 parts) and finely powdered anhydrous sodium bicarbonate (3.0 parts) is then added to the coating composition at 40° and the mixture well stirred.

An ice cream bar at −20° is coated by dipping it into the chocolate-coating composition at 35°, excess coating composition is allowed to run off, and the coated bar is stored at −10°.

EXAMPLE 4

To a mixture (13 parts by weight) at 40° consisting of hardened refined coconut oil of slip melting point 33° (3 parts) and refined ground-nut oil (9 parts), the mixture having a slip melting point of between 5° and 10°, and dilatations (base temperature 50°) $D_{10}$ 360, $D_{15}$ 190, $D_{20}$ 120, $D_{25}$ 85, $D_{30}$ 55 and $D_{35}$ 35, and icing sugar (1 part), is added the effervescent mixture of citric acid and sodium bicarbonate of Example 1 (4.5 parts), which is dispersed by stirring, and the mixture allowed to cool to 20°.

A mould of the type used for ice lolly production, and of capacity 32 cc. is then filled with the aqueous medium of a water-ice formulation consisting of water, flavour and 0.3% of sodium carboxymethyl cellulose as crystallisation controlling agent, together with citric acid to pH 3.5. A stick as holder is suspended in the mould contents and the contents then frozen to −20° by cooling the exterior of the mould in brine at −30°. The frozen contents of the mould are extracted and dipped into the liquid fat to form a coating of solidified fat containing the effervescent material.

The resulting enrobed water-ice is then dipped into a larger mould (capacity 90 cc.) containing more of the liquid water-ice formulation at 0°: the contents of the mould are frozen to −20° and finally extracted, packed and stored at −20°.

EXAMPLE 5

The liquid hardened coconut and groundnut oil mixture of Example 4 containing effervescent material is converted into solid particulate form by spray cooling into air at 0°, giving solid particles of approximately spherical form and of average diameter 0.5 mm. and volume 0.0005 cc., and consisting of fat containing dispersed sugar and effervescent material.

EXAMPLE 6

The fat particles of Example 5 (10 parts by volume) at 0° are added to the same liquid water-ice formulation as that of Example 4 at 0° (100 parts), the mixture is stirred to form a dispersion and then injected into a mould, a stick holder inserted and the mixture cooled to −20° by holding the mould in brine at −30°.

Extraction from the mould provides a water-ice with the fat particles dispersed in it. When the water-ice is consumed by licking or sucking, the fat particles melt on the tongue, and release the effervescent material contained in them, which then effervesces.

EXAMPLE 7

To butter oil (12 parts by weight) at 40° is added icing sugar (1 part), followed by finely powdered anhydrous citric acid powder (2 parts by weight) and finely powdered anhydrous sodium bicarbonate (2.5 parts), and the mixture stirred to give a thorough dispersion. The molten mixture is converted into solid particulate form by spray cooling into air at 0° to give solid particles of approximately spherical form and of average diameter 0.3 mm. consisting of butterfat containing dispersed sugar and effervescent material.

EXAMPLE 8

The fat particles of Example 7 (6 parts by weight) are added into an ice cream batch freezer containing an ice cream mix (94 parts) at −2° while the mix is being beaten under pressure with air, and the freezing and beating process continued until the ice cream is formed. The ice cream product is stored at −25° C.

On consumption of the ice cream the effervescence is released after the ice has melted.

EXAMPLE 9

To a mixture (55.6 parts by weight) at 30° consisting of hardened refined coconut oil of slip melting point 33° (11.1 parts) and refined groundnut oil (44.5 parts), the mixture having a slip melting point of about 5° and dilatations (base temperature 50°) $D_0$ 400, $D_5$ 360, $D_{10}$ 235, $D_{15}$ 195, $D_{20}$ 65, and $D_{25}$ 50, are added lecithin (0.2 part) and a mixture of icing sugar (32.6 parts), finely powdered anhydrous citric acid (5.9 parts) and finely powdered anhydrous sodium bicarbonate (6.7 parts), which are then dispersed by stirring and the mixture allowed to cool to 20°.

The liquid mixture is then converted to solid particulate form by spraying through a nozzle of about 1 mm. diameter under about 800 lb. pressure into a vessel containing liquid nitrogen. The resulting particles are sieved on a 14-mesh British Standard Sieve previously cooled with liquid nitrogen and particles of average diameter over 1.2 mm. thus removed: the particles passing the sieve are sieved with a cooled 150 mesh British Standard Sieve to remove particles of average diameter below 0.1 mm., leaving particles consisting of fat containing dispersed sugar and effervescent material of average diameter within the range of from 0.1 to 1.2 mm., which are stored at −20°.

EXAMPLE 10

The fat particles of Example 9 (15 parts by weight) at −20° are stirred into the liquid water-ice formulation of Example 4 (85 parts) maintained as an icy slush at −5°, and the mixture injected into a mould, a stick holder inserted and the mould containing the mixture cooled to −20°.

Extraction from the mould provides a water-ice which when consumed releases effervescence practically simultaneously with melting of the ice.

EXAMPLE 11

To a mixture (55.6 parts by weight) at 40° consisting of hardened refined coconut oil of slip melting point 33° (27.8 parts) and refined groundnut oil (27.8 parts), the mixture having a slip melting point of about 16° and dilatations (base temperature 50°) $D_0$ 795, $D_5$ 725, $D_{10}$ 635, $D_{15}$ 555, $D_{20}$ 310 and $D_{25}$ 60 are added lecithin (0.2 part), and a mixture of icing sugar (11.6 parts), saccharin (0.18 part), finely powdered anhydrous citric acid (17.2 parts), and finely powdered anhydrous sodium bicarbonate (15.1 parts), which are then dispersed by stirring.

The mixture is converted into solid particulate form as in Example 9, and the product stored at −5°.

EXAMPLE 12

The fat particles of Example 11 are incorporated in a water-ice by a process similar to that of Example 10. The resulting water-ice when consumed releases effervescence after the melting of the ice.

What is claimed is:

1. A confection comprising a solid water-impermeable edible fatty acid ester that is fluid at a temperature within the range of from about 0° C. to about 30° C. and an effervescent material containing as essential components a solid edible water-soluble acid and solid sodium bicarbonate, the ester containing at least one such essential component of the effervescent material, so that effervescence occurs when the ester is made fluid by the increase of temperature on consumption and the effervescent material is brought into contact with water.

2. A confection according to claim 1, in which the ester contains dispersed within it all essential components of the effervescent material.

3. A confection according to claim 2, in which the ester is solid at −5° C.

4. A confection according to claim 2, in which the ester is a fat.

5. A confection according to claim 4, in which the ester comprises butter oil.

6. A confection according to claim 3, in which the ester comprises hardened coconut oil and groundnut oil.

7. A confection according to claim 2, in which the ester containing the dispersed effervescent material is in particulate form.

8. A confection according to claim 2, in which the ester containing the dispersed effervescent material is fat in the form of particles of diameter within the range of from 0.05 to 1 mm.

9. A confection according to claim 2, in which the ester containing the dispersed effervescent material is in surface contact with ice.

10. A confection according to claim 9, comprising ice enrobed with the ester containing the dispersed effervescent material.

11. A confection according to claim 2, in which the ester containing the dispersed effervescent material is in particular form dispersed through the ice.

12. A confection according to claim 11, comprising a dispersion in an ice matrix of particles of fat of diameter within the range of from 0.05 to 1 mm., and solid water-soluble edible acid and solid sodium bicarbonate dispersed within the particles, the fat providing the continuous phase within the particles.

13. A confection according to claim 12, in which the fat has a melting point of between 0° and 10° C.

14. A confection according to claim 12, in which the fat has a melting point of between 10° and 20° C.

15. A confection according to claim 9 wherein the ice is selected from the group consisting of water ice and ice cream.

16. A process for preparing a confection comprising:
    (a) dispersing a solid water-soluble edible acid and solid sodium bicarbonate in a molten water-impermeable edible fatty acid ester that is fluid at a temperature within the range of from about 0° C. to about 30° C. and solid at −5° C.; and
    (b) spray cooling the molten ester to form solid particles of diameter within the range of from 0.05 mm. to 1 mm.

17. A process as claimed in claim 16 which further comprises dispersing the solid particles in an aqueous water ice medium at a temperature below the melting point of the ester and cooling the aqueous medium to form a water ice.

18. A process according to claim 16, in which the ester is a fat.

References Cited

UNITED STATES PATENTS

| | | | |
|---|---|---|---|
| 1,397,168 | 11/1921 | Ingle | 99—136 |
| 2,278,466 | 4/1942 | Musher | 99—1 |
| 2,633,604 | 4/1953 | Allen et al. | |
| 2,638,475 | 5/1953 | Ross. | |

RAYMOND N. JONES, Primary Examiner

J. M. HUNTER, Assistant Examiner

U.S. Cl. X.R.

99—136